(12) United States Patent
Sawabe et al.

(10) Patent No.: US 11,115,549 B2
(45) Date of Patent: Sep. 7, 2021

(54) IMAGE SENSOR MOUNTING BRACKET AND IMAGE SENSOR DEVICE USING SAME

(71) Applicant: Mitsubishi Electric Corporation, Chiyoda-ku (JP)

(72) Inventors: Toshiyuki Sawabe, Chiyoda-ku (JP); Kosaku Yamagata, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/968,291

(22) PCT Filed: Mar. 13, 2019

(86) PCT No.: PCT/JP2019/010317
§ 371 (c)(1),
(2) Date: Aug. 7, 2020

(87) PCT Pub. No.: WO2019/188301
PCT Pub. Date: Oct. 3, 2019

(65) Prior Publication Data
US 2020/0374412 A1    Nov. 26, 2020

(30) Foreign Application Priority Data
Mar. 28, 2018    (JP) .............................. JP2018-062482

(51) Int. Cl.
*H04N 1/04*    (2006.01)
*H04N 1/00*    (2006.01)
(Continued)

(52) U.S. Cl.
CPC ..... *H04N 1/00559* (2013.01); *H04N 1/00557* (2013.01); *H04N 1/028* (2013.01); *H04N 5/2253* (2013.01)

(58) Field of Classification Search
CPC ........... H04N 1/00559; H04N 1/00557; H04N 1/028; H04N 5/2253
See application file for complete search history.

(56) References Cited

U.S. PATENT DOCUMENTS 5,281,803 A * 1/1994 Ishizuka .............. H04N 1/0315
250/208.1
5,517,329 A    5/1996 Ishizuka
(Continued)

FOREIGN PATENT DOCUMENTS

JP    4-61547 A    2/1992
JP    2005-341306 A    12/2005
(Continued)

OTHER PUBLICATIONS

International Search Report dated May 8, 2019 in PCT/JP2019/010317 filed Mar. 13, 2019, citing documents AA-AD and AO-AR therein, 2 pages.
(Continued)

*Primary Examiner* — Cheukfan Lee
(74) *Attorney, Agent, or Firm* — Oblon, McClelland, Maier & Neustadt, L.L.P.

(57) ABSTRACT

For an image sensor that is elongated in a main scanning direction, an image sensor mounting bracket is obtained that suppresses a warp of the image sensor due to the weight thereof. The image sensor mounting bracket includes a fastening element to be fastened to a lateral surface of the image sensor and a fastening element to be fastened to an attachment target object, the fastening element intersecting the image sensor-side fastening element. The fastening element has an image sensor fastening surface abutting the image sensor and having positioning pins, and the attachment target object fastening element has an attachment target object fastening surface abutting the attachment target object and having elongated through holes that elongate in
(Continued)

a sub-scanning direction and are arranged in the main scanning direction and the sub-scanning direction.

18 Claims, 19 Drawing Sheets

(51) Int. Cl.
*H04N 1/028* (2006.01)
*H04N 5/225* (2006.01)

(56) References Cited

U.S. PATENT DOCUMENTS

| | | | |
|---|---|---|---|
| 7,684,100 B2* | 3/2010 | Amada | G02B 7/023 359/224.1 |
| 8,058,602 B2* | 11/2011 | Wang | H04N 1/0312 250/208.1 |
| 8,096,472 B2* | 1/2012 | Schwartz | G06K 7/10722 235/454 |
| 8,921,762 B2* | 12/2014 | Nakaie | G03G 21/1666 250/239 |
| 9,253,358 B2* | 2/2016 | Murakami | G02B 6/0001 |
| 2005/0264854 A1 | 12/2005 | Ikeda | |
| 2013/0181311 A1 | 7/2013 | Sugiyama | |
| 2016/0037011 A1 | 2/2016 | Fujiuchi et al. | |
| 2016/0261763 A1* | 9/2016 | Fujiuchi | H04N 1/0318 |

FOREIGN PATENT DOCUMENTS

| | | |
|---|---|---|
| JP | 2013-168925 A | 8/2013 |
| WO | WO 2014/148237 A1 | 9/2014 |

OTHER PUBLICATIONS

Japanese Office Action dated Feb. 18, 2020 in Japanese Application No. 2019-563304, citing documents AO-AR therein, 16 pages (with English translation).

Japanese Office Action dated Jul. 14, 2020 in Japanese Application No. 2019-563304, citing documents AO-AR therein, 22 pages (with English translation).

* cited by examiner

IMAGE SENSOR MOUNTING BRACKET AND IMAGE SENSOR DEVICE USING SAME

TECHNICAL FIELD

The present disclosure relates to an image sensor mounting bracket for mounting an image sensor used for a facsimile machine, a copier, a scanner, and the like to an attachment target object, and an image sensor device using the same.

BACKGROUND ART

An image sensor is used with the image sensor attached to an attachment target object such as a facsimile machine, a copier, or a scanner.

A structure for attaching an image sensor to an attachment target object using flanges provided at both ends of the image sensor in a main scanning direction is disclosed as a structure for attaching an image sensor to a higher-order attachment target object (refer to Patent Literature 1).

CITATION LIST

Patent Literature

Patent Literature 1: International Publication No. WO 2014/148237

SUMMARY OF INVENTION

Technical Problem

The techniques disclosed in Patent Literature 1 have a problem in that, if the length of the image sensor in the main scanning direction is long, the image sensor itself is warped by the weight of the image sensor, thereby causing deterioration of a modulation transfer function (MTF: spatial resolution) characteristic.

In order to solve the aforementioned problem, an objective of the present disclosure is to achieve: an image sensor mounting bracket enabling suppression of a warp in an image sensor caused by the weight of the image sensor when the image sensor has a long length in a main scanning direction; and an image sensor device using the same.

Solution to Problem

An image sensor mounting bracket according to the present disclosure, which is an image sensor mounting bracket for mounting an image sensor to an attachment target object, includes: a first fastening element to be fastened to a lateral surface of the image sensor, the lateral surface extending in a main scanning direction; and a second fastening element to be fastened to the attachment target object, the second fastening element intersecting with the first fastening element and extending in a sub-scanning direction, wherein the first fastening element includes a first fastening surface that abuts the image sensor and has a plurality of positioning pins to determine a position of mounting of the image sensor mounting bracket to the image sensor, the positioning pins being arranged in the main scanning direction on a straight line parallel to the main scanning direction, and the second fastening element includes a second fastening surface that abuts the attachment target object and has a plurality of elongated through holes that are arranged in the main scanning direction and in the sub-scanning direction and each elongate in the sub-scanning direction.

Advantageous Effects of Invention

An image sensor mounting bracket enabling suppression of a warp of an image sensor caused by the weight of the image sensor and an image sensor device using the same can be obtained according to the present disclosure.

DESCRIPTION OF EMBODIMENTS

Embodiment 1

An image sensor 10 according to Embodiment 1 of the present disclosure is described below with reference to attached drawings.

Figure 1:
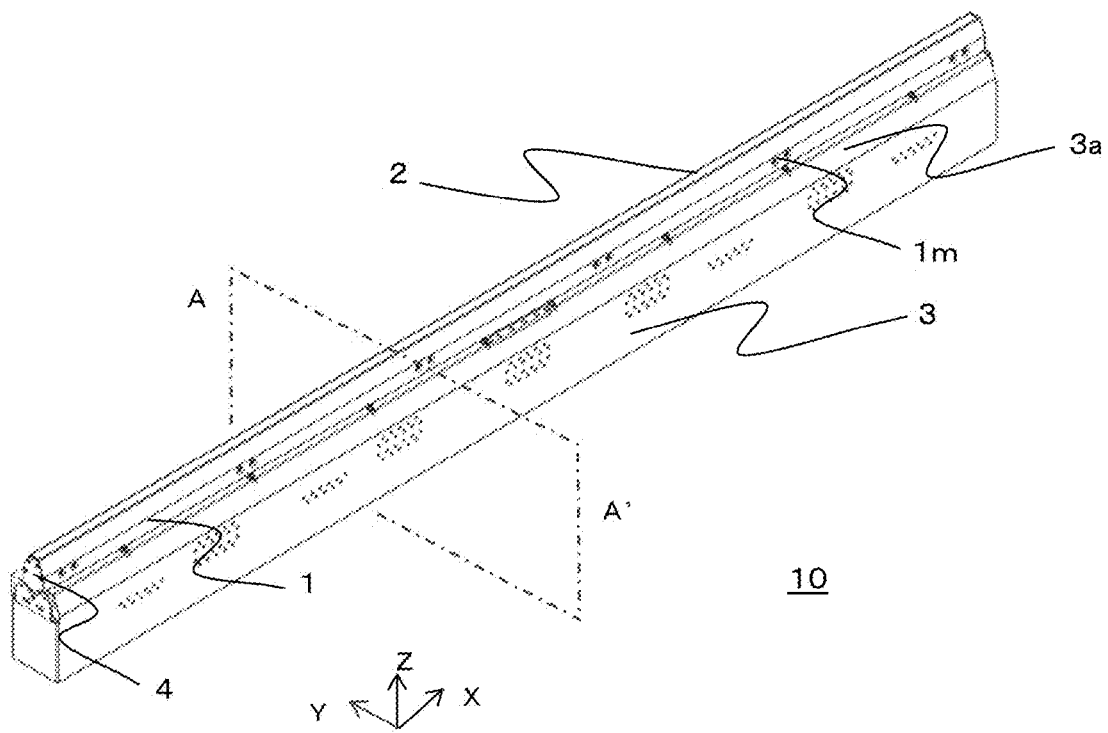
FIG. 1 is a perspective view of an image sensor according to Embodiment 1 of the present disclosure.

FIG. 1 is a perspective view of the image sensor 10 according to Embodiment 1 of the present disclosure. As illustrated in FIG. 1, a main scanning direction of the image sensor 10 is taken to be the x direction, a sub-scanning direction is taken to be the y direction, and a reading distance direction is taken to be the z-direction. In FIG. 1, the origin of the x-direction is set on a center of the overall length of image sensor 10 in the x direction (on a below-described center line of FIGS. 4A and 4B in the x-direction), the origin of the y-direction is set on a center of the overall length of image sensor 10 in the y direction (on a below-described center line of FIG. 2 in the y-direction), and the origin of the z-direction is set on a surface of a transparent body 2 that faces a manuscript M.

Figure 2:
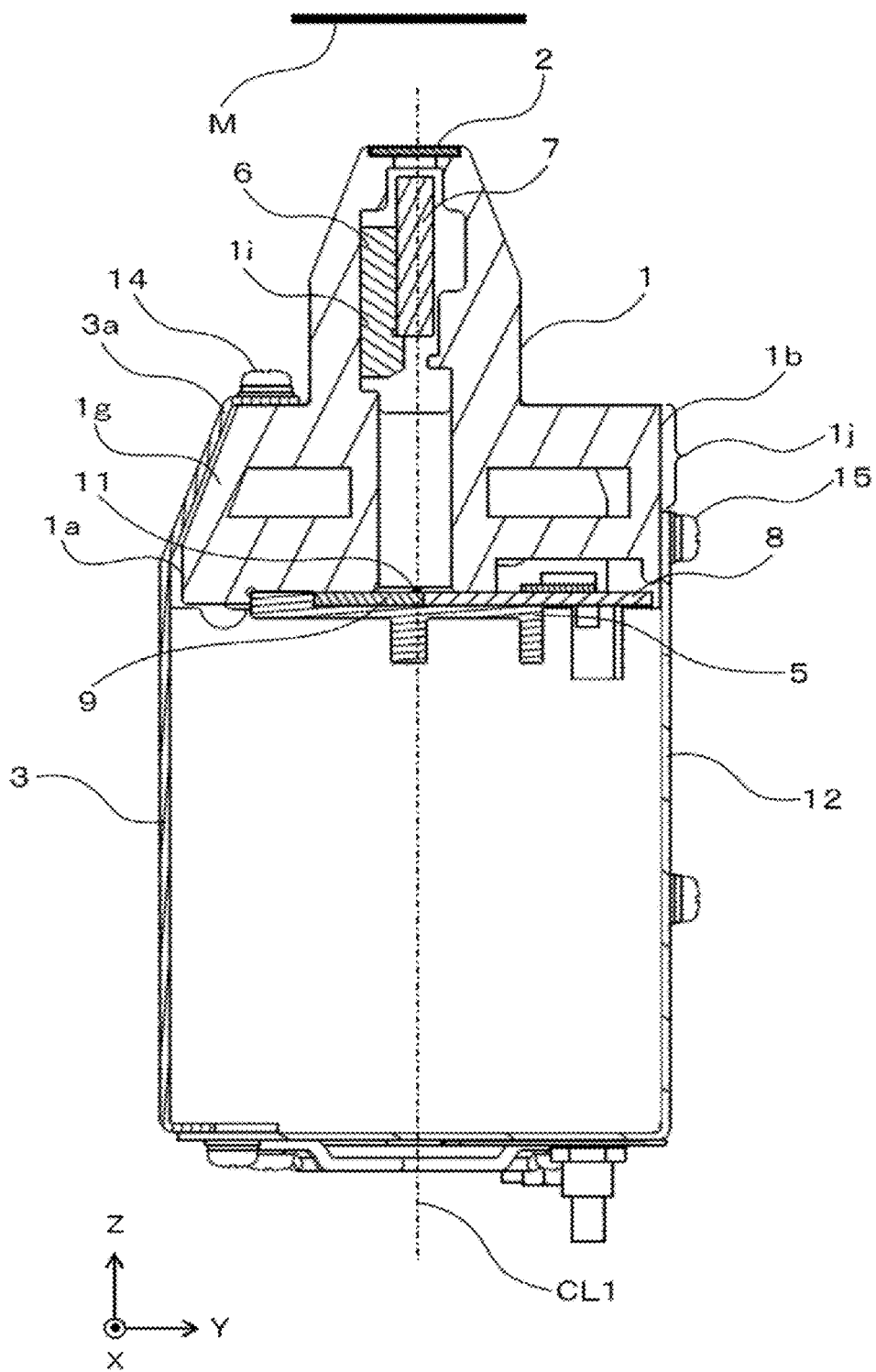
FIG. 2 is a cross-sectional view taken along a plane A-A' in FIG. 1.

FIG. 2 is a cross-sectional view of the image sensor 10 taken along a plane A-A' in FIG. 1 according to Embodiment 1 of the present disclosure. The manuscript M is a reading target medium (an object to be irradiated) that contains image information of, for example, banknotes, securities, and other general documents.

The transparent body 2 is made of, for example, resin or glass, has a predetermined width in the y direction, and extends in the x direction. The transparent body 2 is fixed to a frame 1 and faces the manuscript M.

The frame 1 is made of light-shielding material, for example, metal. The frame 1 has plane-shaped lateral surfaces 1a and 1b on both sides in the y direction (the sub-scanning direction), and the lateral surfaces 1a and 1b are parallel to the xz plane and extend in the x-direction (the main scanning direction). The lateral surface (flat surface) 1a is a lateral surface located on the left side of a center line CL1 in FIG. 2, and the lateral surface (flat surface) 1b is a lateral surface located on the right side of the center line CL1 in FIG. 2. The center line CL1 is located at the center (central portion) of length of the image sensor 10 in the y-direction (the sub-scanning direction). The frame 1 has a flat end portion at an end of the lateral surface (flat surface) 1b in the z-direction, and the flat end portion is parallel to the y direction (the sub-scanning direction) and extends in the x direction (the main scanning direction). The frame 1 has a protrusion portion protruding in the z direction from the flat end portion, and the transparent body 2 is attached to an end of the protrusion portion, and an imaging optical system 7 described later is installed inside the protrusion portion.

The imaging optical system 7 is placed between the manuscript M and a sensor IC 11, for example, including rod lenses arranged in an array. In Embodiment 1, a lateral surface of the imaging optical system 7 in the main scanning direction (x-direction) is fixed, with an adhesive or a tape, to a lateral surface of a lens fixing plate 6 in the main scanning direction (x-direction) and thus is held by the lens fixing plate. The lens fixing plate 6 to which the imaging optical system 7 is attached (fixed) is fixed to the frame 1 with screws that are screwed into focus adjustment slots 1m, as illustrated in FIG. 1. The imaging optical system 7 has an optical axis perpendicular to a reading surface (manuscript surface) of the manuscript M, and has a function for focusing light reflected or transmitted by the manuscript M onto the sensor IC 11 to form an image.

The sensor IC 11 receives the light made to converge by the imaging optical system 7, photoelectrically converts the received light, and outputs an electrical signal. The sensor IC 11 includes a semiconductor chip and the like and is equipped with a light receiving unit that photoelectrically converts the received light and a drive circuit that drives the light receiving unit and other circuits.

The sensor IC 11 is fixed to a base plate 9 with an adhesive. The base plate 9 together with a base plate 8 having another function is fixed to a base plate supporting plate 5. The base plates 8 and 9 are fixed to the base plate supporting plate 5 by fixing means such as an adhesive, a tape, or a screw.

In the frame 1, a portion of the frame 1 placed between (i) the base plate supporting plate 5 to which the base plates 8 and 9 are fixed and (ii) the imaging optical system 7 blocks light that enters the sensor IC 11 from the outside of the image sensor 10 without passing through the imaging optical system 7. In addition, the portion of the frame 1 placed between the base plate supporting plate and the imaging optical system has a dustproofing effect of preventing dust and the like from entering the sensor IC 11.

Covers 3 and 12 are attached to the frame 1. Cover 3 is attached to a flat surface of the frame 1 (a flat surface on the left side of the protruding portion of the frame 1) with screw 14 and Cover 12 is attached to the lateral surface (flat surface) 1b with screws 15. The cover 3 includes a slope 3a extending in the x direction to enable the image sensor 10 to be attached with the imaging sensor 10 inclining. The frame 1 includes a slope 1g, extending in the x direction, located on the slope 3a-side of the frame 1, and the slope 1g has the same inclination angle as the slope 3a of the cover 3 and has a shape so as not to interfere with the cover 3. The slope 1g is placed between the lateral surface (flat surface) 1a and the flat surface of the frame 1.

The cover 12 does not cover the whole of the flat surface 1b of the frame 1, and a document M-side portion of the flat surface 1b of the frame 1 has a flat surface portion 1j exposed from the cover 12.

Figure 3:
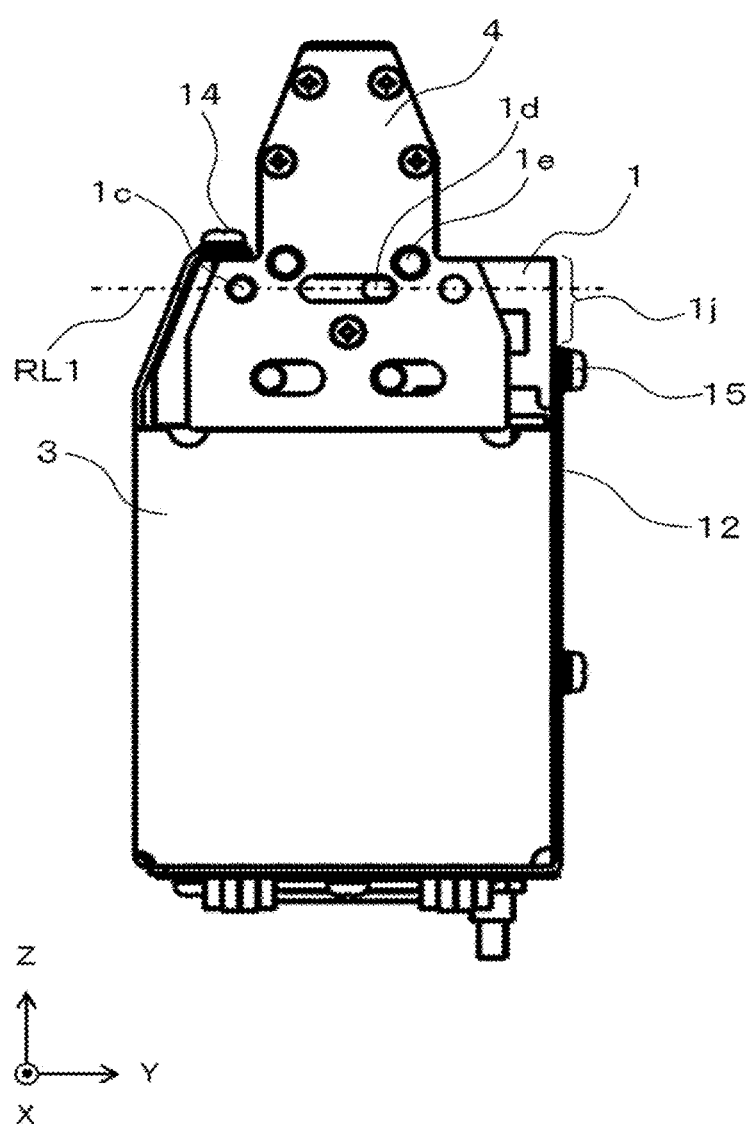
FIG. 3 is a side view of the image sensor according to Embodiment 1 of the present disclosure in a sub-scanning direction.

FIG. 3 is a side view (yz-plane view) of the image sensor 10 according to Embodiment 1 of the present disclosure in a sub-scanning direction (the y-direction).

The lateral surface of the frame 1 in the y-direction (that is, an end surface in the x-direction) is sealed by a sealing plate 4 so as to prevent leakage of light and dust intrusion. The lateral side surface of the frame 1 in the y-direction is fixed, via the sealing plate 4, to an attachment target object. When the image sensor 10 is fixed to the attachment target object, the image sensor 10 must be attached to the attachment target object with the image sensor 10 kept horizontal. Accordingly, positional accuracy is guaranteed by (i) forming a round hole 1c and an elongated hole 1d on a straight line parallel to the y-direction (which is illustrated as a reference line RL1 in FIG. 3) and (ii) fitting into these holes 1c and 1d pilot pins that the attachment target object includes. In this case, the reference line RL1 corresponds to a "second reference line". In addition, in order to firmly fix the image sensor 10 to the attachment target object, four threaded holes 1e arranged on the end surfaces of both ends of the frame 1 in the x-direction (the lateral surfaces in the y-direction) are used in Embodiment 1 to screw the image sensor to the attachment target object.

Figure 4A:
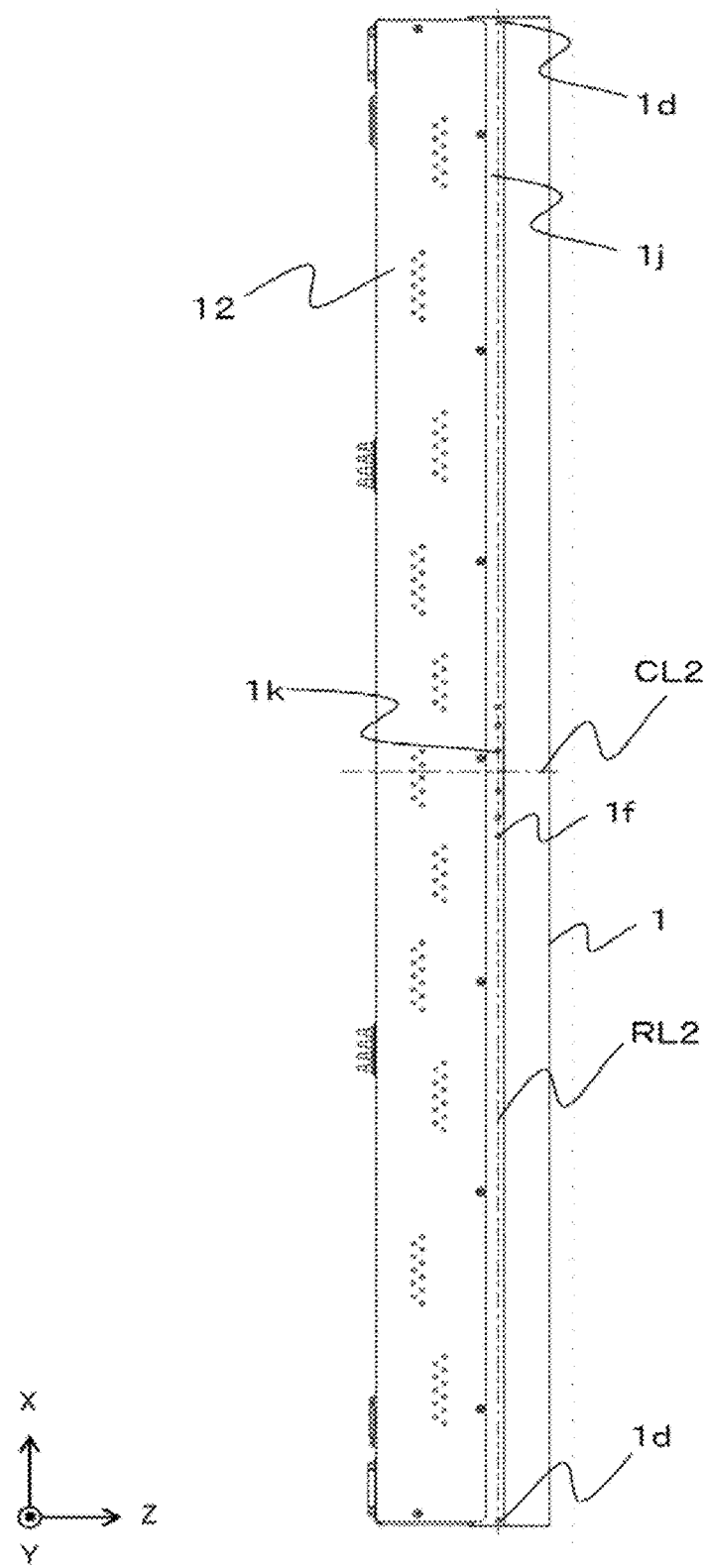
FIG. 4A is a side view of the image sensor according to Embodiment 1 of the present disclosure in a main scanning direction.
Figure 4B:
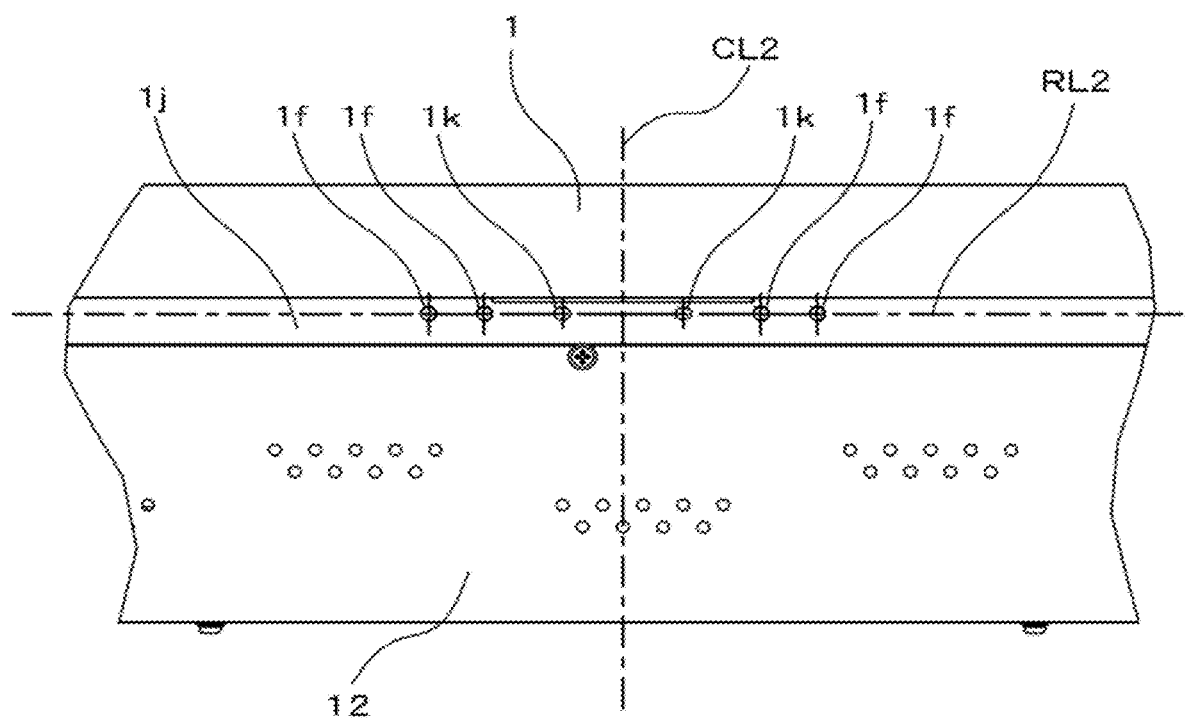
FIG. 4B is an enlarged view illustrating a vicinity of a center line in FIG. 4A.
Figure 4B:
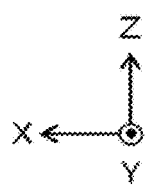

FIGS. 4A and 4B are side views (xz-plane view) of the image sensor 10 according to Embodiment 1 of the present disclosure in the main scanning direction (x-direction)

In FIGS. 4A and 4B, as illustrated in FIG. 3, the flat surface 1b located on the right side of the frame 1 in the y-direction includes the flat surface portion 1j that exposed without coverage by the cover 12. The flat surface portion 1j of the frame 1 has (i) elongated holes 1k that are arranged in the x-direction and symmetrically with respect to the center line CL2 in the x-direction of the image sensor 10 and (ii) threaded holes 1f that are arranged in the x-direction and symmetrically with respect to the center line CL2 in the x-direction of the image sensor 10. For example, in the case of the elongated holes 1k, the elongated holes 1k are arranged on both sides of the center line CL2 in the drawing such that the holes 1k are symmetric with respect to the center line CL2 as an axis of symmetry. That is, one of at least one pair of the elongated holes 1k is arranged to be symmetric to the other of the pair of the elongated holes 1k with respect to the center line CL2.

Additionally, the elongated holes 1k and the threaded holes 1f are arranged on the straight line (that is illustrated as the reference line RL2 in FIGS. 4A and 4B) that connects the elongated holes 1d arranged on the both side surface portions of the both ends of the frame 1 in the x-direction. That is, the reference line RL2 (corresponding to the "first reference line") is a line segment that is parallel to the x-direction (the main scanning direction) on the lateral surface extending in the x-direction of the image sensor 10 (the end surface in the y-direction).

The reference lines RL1 and RL2 intersect each other at both ends of the frame 1 in the x-direction. That is, the reference lines RL1 are set to be parallel to the y-direction (the sub-scanning direction) and intersect the reference line RL2.

Also, a lens fixing plate abutment surface 1i and a focus adjustment slot 1m are provided on the side opposite to the flat surface 1b of the frame 1 (the left side of the frame 1 in the y-direction). The elongated holes 1k and the threaded holes 1f are arranged on the surface opposite to the surface 1i and the slot 1m. As a result, both a focusing operation and avoidance of a warp in the image sensor due to the weight of the image sensor can be achieved without hindering other structures for mounting a mounting bracket 13 and the image sensor 10.

In the above description, for the elongated holes 1k and the threaded holes 1f, the center line CL2 is used as a reference line of symmetry in the x-direction. However, the reference line of symmetry may be set to a line other than the center line CL2. Specifically, any straight line that is different from the center line CL2 may be used as the reference line of symmetry if the straight line is parallel to the center line CL2. In the above description, a single reference line of symmetry is used. However, multiple reference lines of symmetry may be used.

Figure 5:
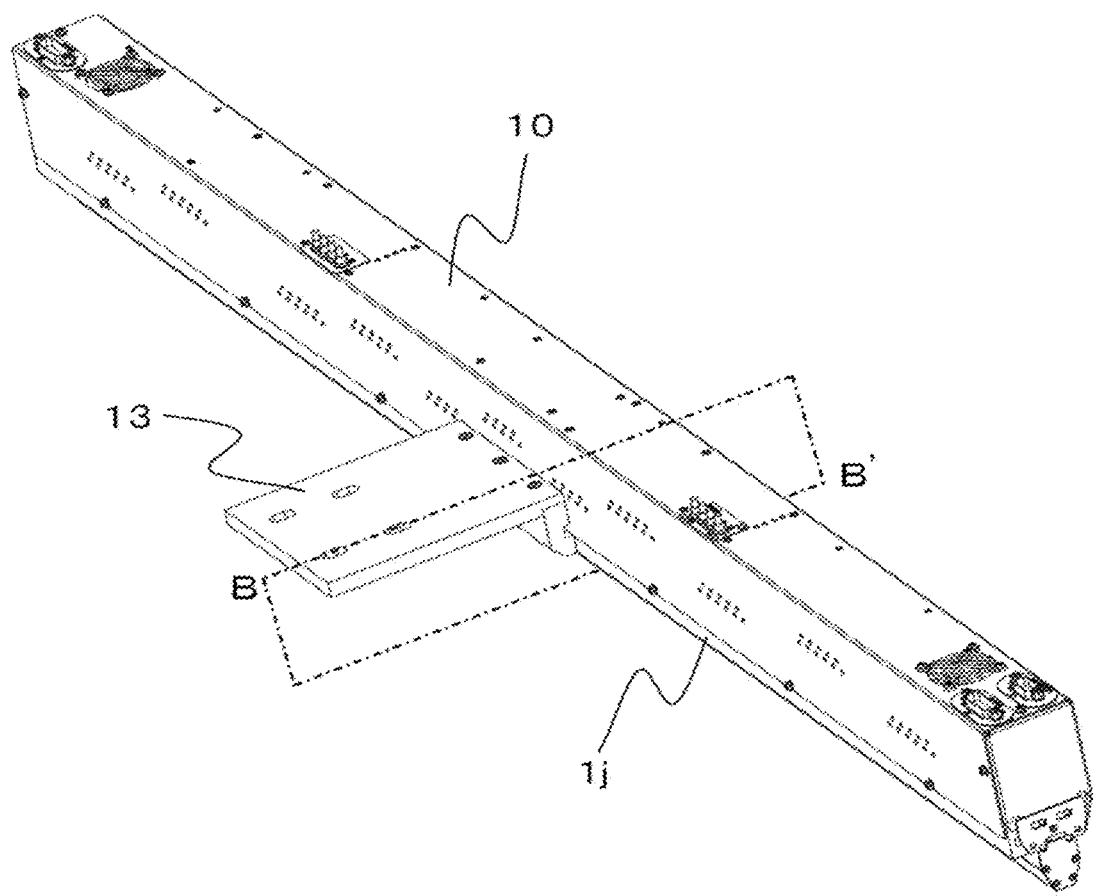
FIG. 5 is a perspective view of a mounting bracket according to Embodiment 1 that is attached to the image sensor.
Figure 6:
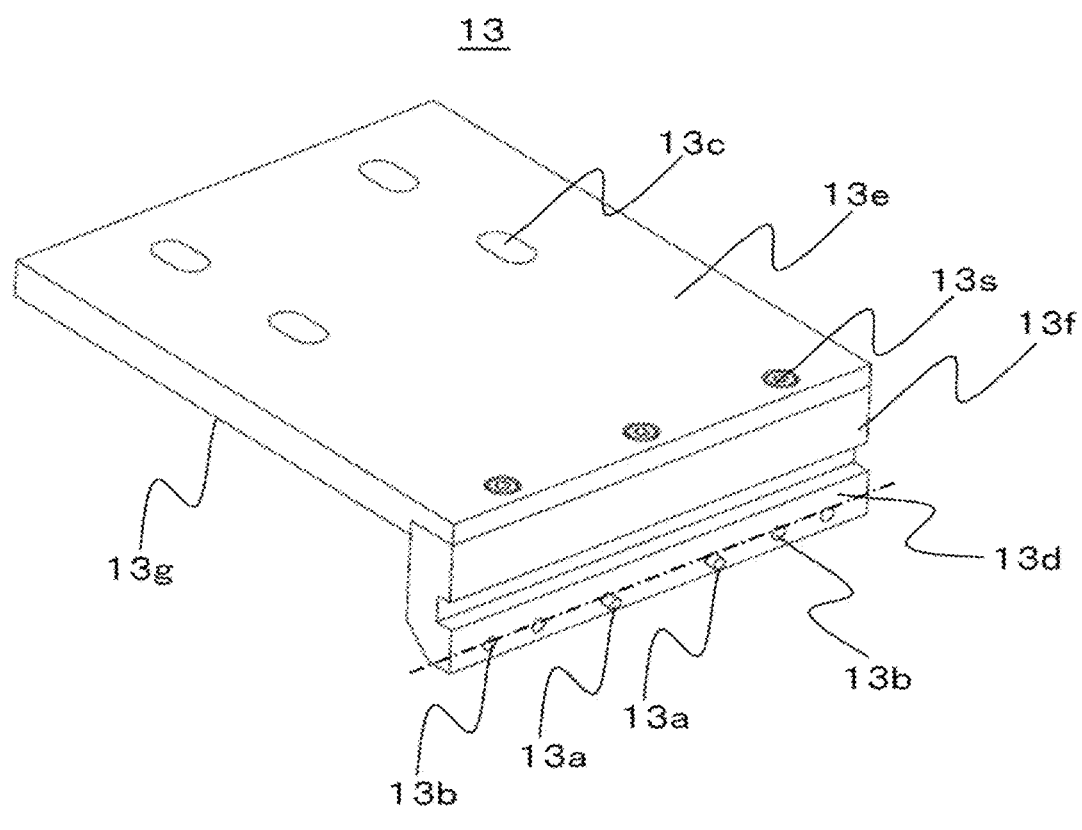
FIG. 6 is a perspective view of the image sensor mounting bracket according to Embodiment 1.
Figure 7:
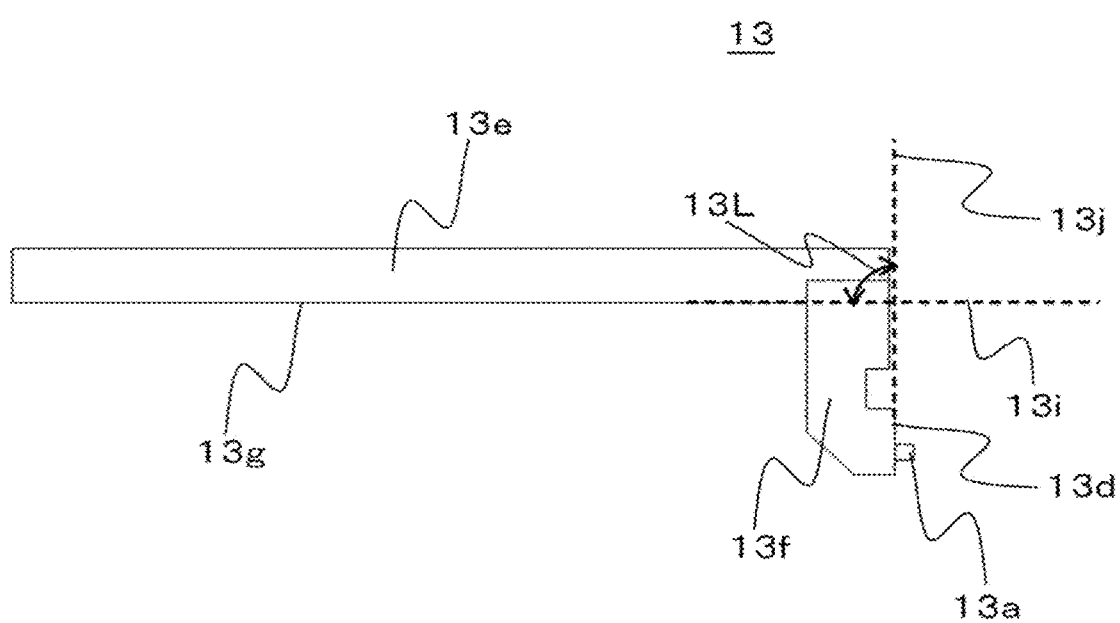
FIG. 7 is a side view of the image sensor mounting bracket according to Embodiment 1.
Figure 7:
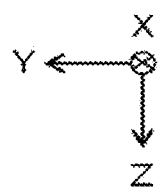

FIG. 5 is a perspective view of a mounting bracket according to Embodiment 1 that is attached to the image sensor. As described above, the flat surface portion 1j exposed from the cover 12 of the flat surface 1b of the frame 1 directly comes into contact with an image sensor fastening surface 13d having a planer shape in the mounting bracket 13. FIG. 6 is a perspective view of the image sensor mounting bracket according to Embodiment 1. As described above, this mounting bracket 13 is used for fixing the frame 1. FIG. 7 is a side view of the image sensor mounting bracket according to Embodiment 1.

The structure of the mounting bracket 13 is described with reference to FIG. 6. The mounting bracket 13 includes (i) an image sensor-side fastening portion 13f (first fastening portion) fastened to the lateral surface extending in the x direction (the main scanning direction) of the image sensor 10, and (ii) an attachment target object fastening portion 13e (second fastening portion) that intersects the image sensor-side fastening portion 13f (first fastening portion), extends in the y-direction (the sub-scanning direction), and is fastened to the attachment target object. The image sensor-side fastening portion 13f (first fastening portion) and the attachment target object fastening portion 13e (second fastening portion) are configured to be components separate from each other and are fastened to each other by screws 13s.

The image sensor-side fastening portion 13f (first fastening portion) includes multiple pilot pins 13a (positioning pins 13a) that are arranged in the x-direction and on a straight line parallel to the x-direction (the main scanning direction) on the image sensor fastening surface 13d (first fastening surface) that is a flat surface coming into contact with the image sensor 10. The pilot pins 13a (positioning pins 13a) are pins used for positioning of the mounting bracket 13 during attachment (fastening) to the image sensor 10. The pilot pins 13a (positioning pins 13a) are arranged in the y-direction (main scanning direction) and on a straight line parallel to the y-direction (the main scanning direction).

The attachment target object fastening portion 13e (second fastening portion) has, on an attachment target object fastening surface 13g (second fastening surface) coming in contact with the attachment target object, multiple elongated holes that are elongated in the y-direction (sub-scanning direction) and short in the x-direction (main scanning direction), penetrate in the z-direction, and are formed on the attachment target object fastening surface 13g in the x-direction (main scanning direction) and the y-direction (sub scanning direction).

Specifically, as illustrated in FIG. 7, an extension line 13j (also referred to as a virtual surface of the image sensor fastening surface 13d or as a first virtual surface) of the image sensor fastening surface 13d (first fastening surface) intersects with an extension line 13i (also referred to as a virtual surface of the attachment target fastening surface 13g or as a second virtual surface) of the attachment target fastening surface 13g (second fastening surface) at an intersection angle 13L of 90 degrees, that is at a right angle.

The elongated holes 1k of the image sensor 10 are fitted with the pilot pins 13a of the mounting bracket 13 illustrated in FIG. 6 with a clearance fit.

For example, in a case in which the pilot pins 13a are fitted into the elongated holes 1k each having a diameter of 3 mm, fit tolerance of the elongated holes 1k is H10 (+0.025 mm/−0.000 mm) and a fit tolerance of the pilot pin 13a is g5 (−0.002 mm/−0.006 mm), the image sensor 10 is attached to the attachment target object with an accuracy of 0.031 mm or less. This accuracy is sufficiently small as compared with an accuracy necessary for mounting the image sensor 10 in the reading distance direction (z-direction), and thus is allowed.

After positioning of the mounting bracket 13 relative to the attachment target object is accurately performed by inserting the pilot pins 13a (illustrated in FIGS. 6 and 7) of the mounting bracket 13 into the elongated holes 1k (illustrated in FIGS. 4A and 4B) (by fitting the pilot pins 13a with the elongated holes 1k with a clearance fit), the mounting bracket 13 is completely fixed and mounted to the image sensor 10 by passing screws through the threaded holes 1f of the image sensor 10 and the screw through holes 13b of the mounting bracket 13. By attaching the mounting bracket 13 to the image sensor 10 as described above, the image sensor device can be configured.

The image sensor 10 illustrated in FIGS. 4A and 4B has two or more elongated holes 1k (corresponding to "positioning holes"), and the mounting bracket 13 can be attached to the image sensor 10 while the mounting bracket 13 is kept horizontal, that is, parallel to the main scanning direction, by using the elongated holes k. Two or more threaded holes 1f are arranged on the reference line RL2 in the x-direction and the image sensor 10 is firmly fixed to the mounting bracket 13 by using the threaded holes 1f. Although the two or more elongated holes 1k are provided, at least one elongated hole 1k may be provided to be used as a positioning hole for screw fastening, and the remaining positioning holes for screw fastening may be round holes or elongated holes. In this case, both the elongated holes 1k and the round holes correspond to "positioning holes". The image sensor 10 has the "positioning holes", and at least one of the "positioning holes" may be formed as the elongated hole 1k. In the case of the above-described configuration, a positioning pin 13a is inserted into at least one elongated hole 1k with a clearance fit. As a result, the image sensor mounting bracket 13 and the image sensor 10 are fixed (attached) to each other, thereby enabling the image sensor mounting bracket 13 to be accurately fixed to the image sensor 10.

When the image sensor 10 is lengthened, (i) the modulation transfer function (MTF, spatial resolution) value may deteriorate due to a warp of the image sensor 10 caused by increased weight of the image sensor 10 in the z-direction, and (ii) resonance phenomenon may occurs due to a decrease in the resonance frequency of the image sensor 10, particularly the frame 1.

The elongated holes 1k and the threaded holes 1f are arranged on the lateral surface of the image sensor 10 extending in the x-direction, thereby enabling the mounting bracket 13 to be kept horizontal (that is, parallel to the main scanning direction), and the mounting bracket 13 is fixed to the attachment target object with screws or the like, thereby enabling suppression of a warp of the image sensor 10 in the z-direction that occurs when the image sensor 10 is installed on the attachment target object. In addition, since the image sensor 10 is firmly fixed at the threaded holes 1f, the threaded holes 1f become vibration nodes in a vibrating environment. Therefore, the resonance frequency of the image sensor 10 can be improved (increased), and damage to the image sensor 10 due to the resonance phenomenon can be prevented. The elongated holes 1k and the threaded holes 1f are preferably arranged in the x-direction and on the same straight line parallel to the x-direction.

When the image sensor 10 is elongated in the x direction, problematic warp of the frame 1 may occur when the frame 1 is molded by extrusion molding. The warp of the frame 1 in the z-direction can be solved by the elongated holes 1k and the pilot pins 13a. However, the warp of the frame 1 in the y-direction cannot be solved by the above-described structure alone.

The image sensor fastening surface 13d having a planar shape in the mounting bracket 13 has (i) the pilot pins 13a fitted to the elongated holes 1k of the frame 1 and (ii) the screw through holes 13b for screw fitting in the threaded holes 1f of the frame 1 (image sensor fastening through hole 13b). The mounting bracket 13 has elongated holes 13c that each elongate in the y-direction. These holes 13c are through holes (elongated holes) for screws used for attachment to the attachment target object. The use of the elongated holes enables the mounting bracket 13 to be attached to the attachment target object while absorbing the warp occurring due to the extrusion molding during the manufacture of the frame 1 (the warp of the frame 1 in the v-direction), thereby preventing the mounting bracket 13 from applying an external force to the image sensor 10 to increase the warp in the y-direction. Therefore, the warp of the image sensor 10 in the z-direction due to the weight of the image sensor 10 can be suppressed without impairing the reading accuracy in the y-direction. The screw through holes 13b are provided in the x-direction and on the same straight line parallel to the x-direction in which the pilot pins 13a are arranged.

Figure 8:
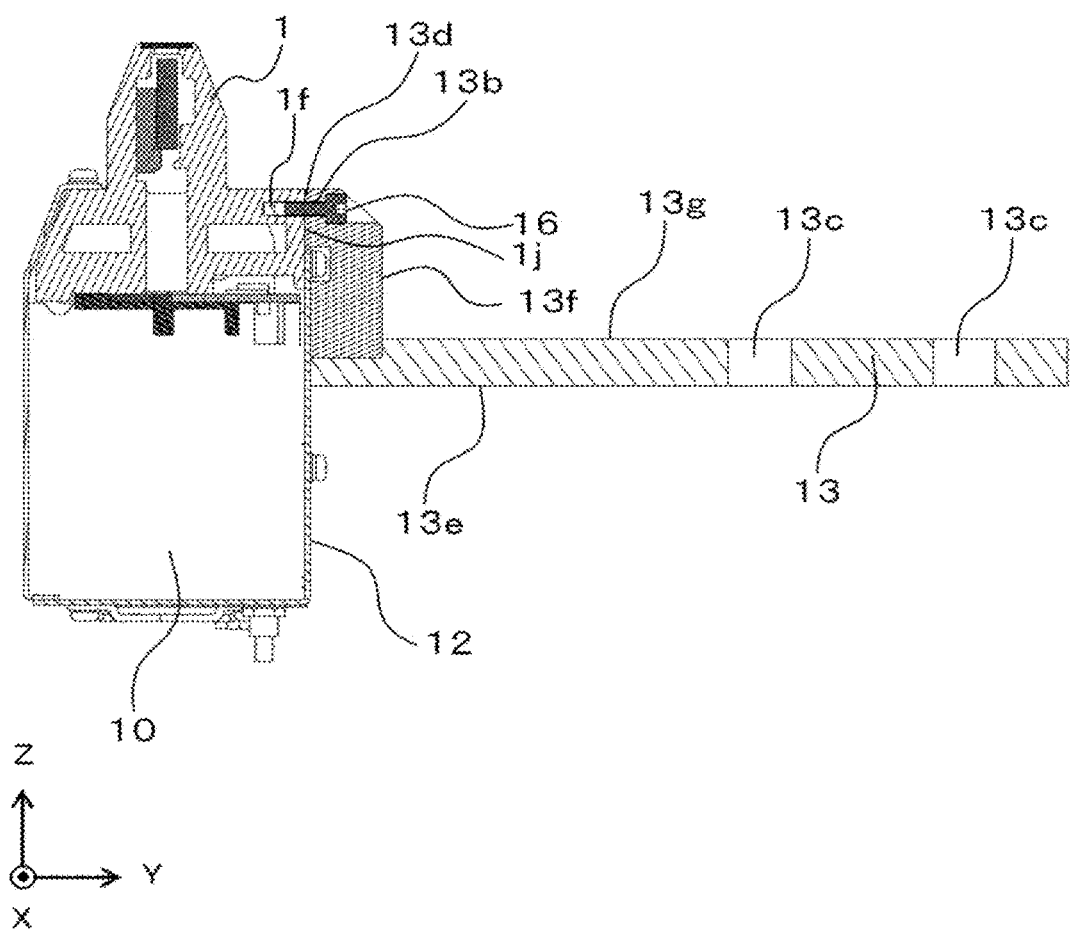
FIG. 8 is a cross-sectional view taken along a plane B-B' in FIG. 5.

FIG. 8 is a cross-sectional view, taken along a plane B-B' in FIG. 5, of the image sensor 10 and the mounting bracket 13 according to the first embodiment of the present disclosure. The flat surface portion 1j exposed from the cover 12 of the flat surface 1b of the frame 1 comes into contact with the image sensor fastening surface 13d of the mounting bracket 13.

Therefore, because of flatness of the flat surface portion 1j that faces the image sensor fastening surface 13d formed as a flat surface in the mounting bracket 13, the mounting bracket 13 is accurately mounted to the image sensor 10, and thus the image sensor 10 is accurately attached to the attachment target object. If the frame 1 does not include a portion (flat surface portion 1j) exposed from the cover 12 of the right-side flat surface 1b in the y-direction, the mounting bracket 13 becomes fixed to the frame 1 via the cover 12 that is a sheet metal. As a result, flatness is difficult to ensure. That is, the accuracy with which the image sensor 10 is attached to the attachment target object deteriorates. In the present embodiment, the image sensor 10 is accurately attached to the attachment target object without causing the above-described deterioration in the accuracy of attachment.

In addition, a screw 16 firmly fixes the frame 1 and the mounting bracket 13 to each other by inserting the screw 16 into the screw through holes 13b provided on the image sensor fastening surface 13d of the mounting bracket 13 and into the threaded holes 1f provided on the flat surface portion 1j of the fame 1, becomes a node of vibration in the vibrating environment, and plays a role in raising the resonance frequency.

In the above-described embodiment, the configuration in which one mounting bracket 13 is attached to the image sensor 10 is described. However, a configuration in which multiple mounting brackets 13 are attached to the image sensor 10 may be employed. In this case, the mounting brackets 13 can be configured to be attached to the image sensor 10 by providing a corresponding pair of an elongated hole 1k and a threaded hole 1f at each of the positions where the mounting brackets 13 are attached.

Embodiment 2

Figure 9:
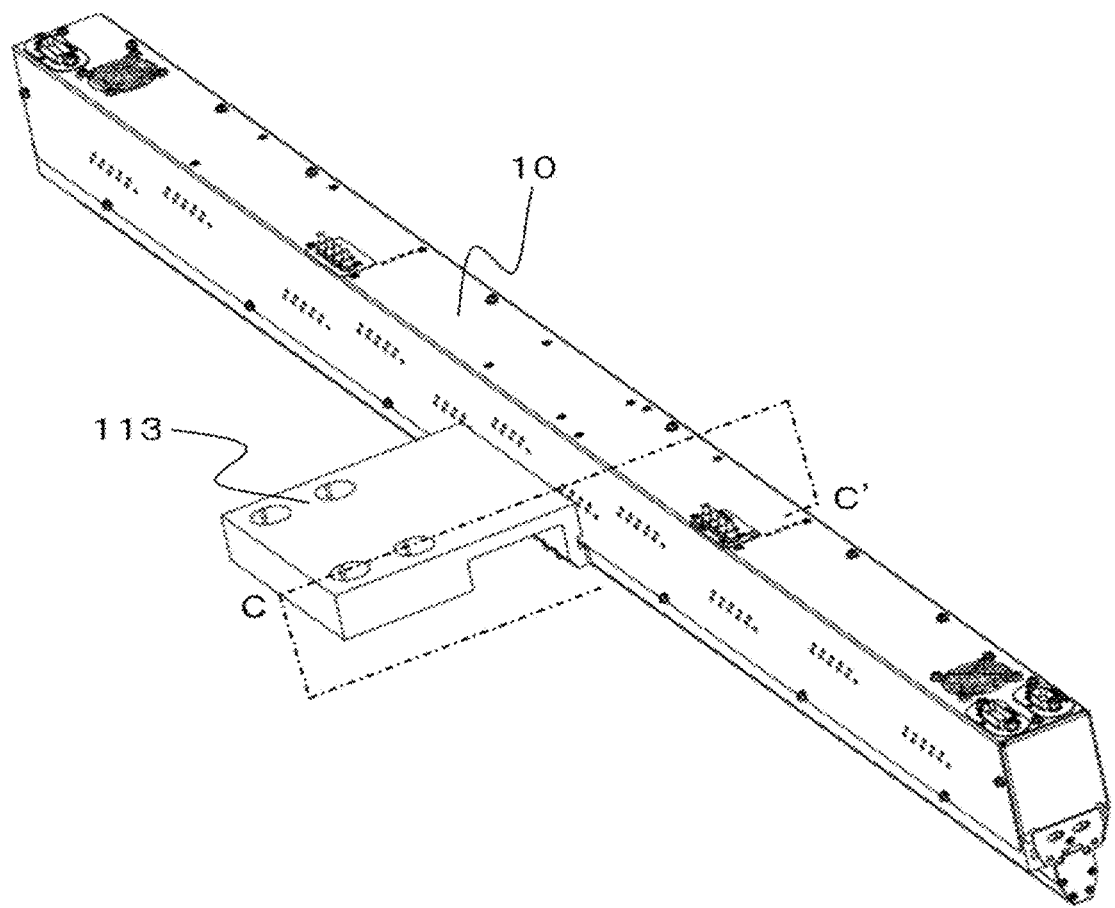
FIG. 9 is a perspective view of a mounting bracket according to Embodiment 2 that is attached to the image sensor.
Figure 10:
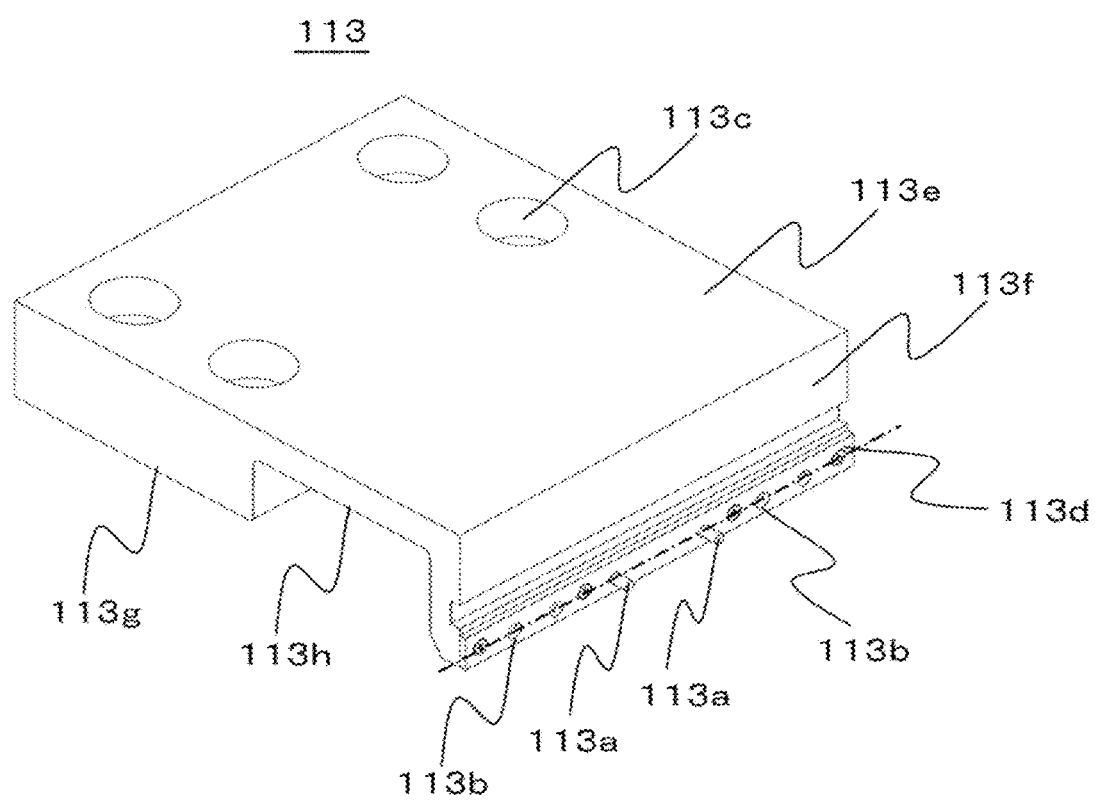
FIG. 10 is a perspective view of the image sensor mounting bracket according to Embodiment 2.
Figure 11:
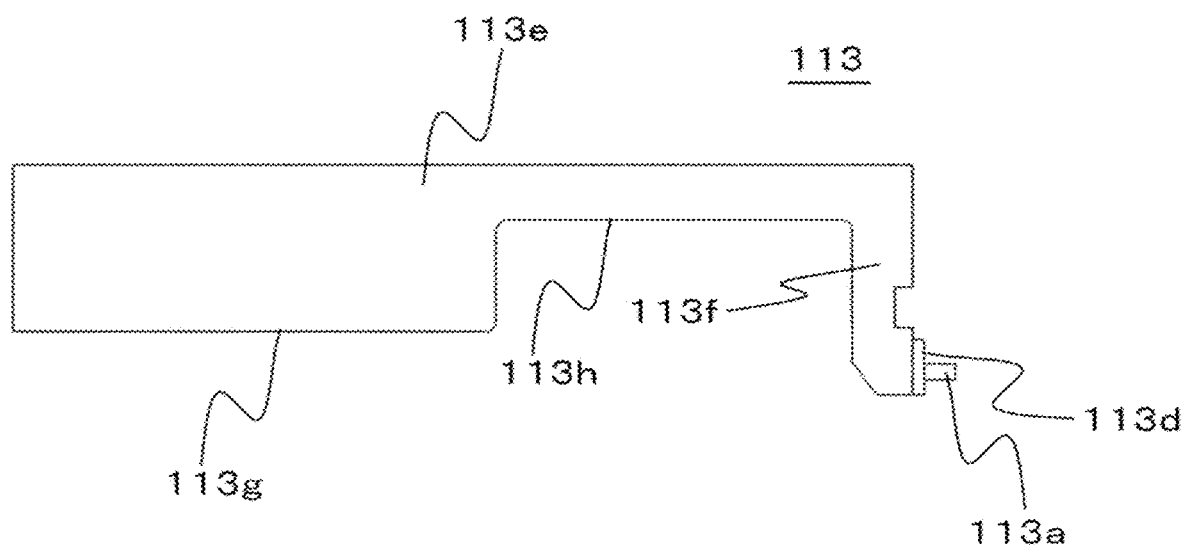
FIG. 11 is a side view of the image sensor mounting bracket according to Embodiment 2.
Figure 11:
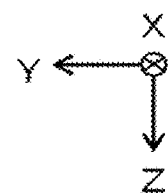
Figure 12:
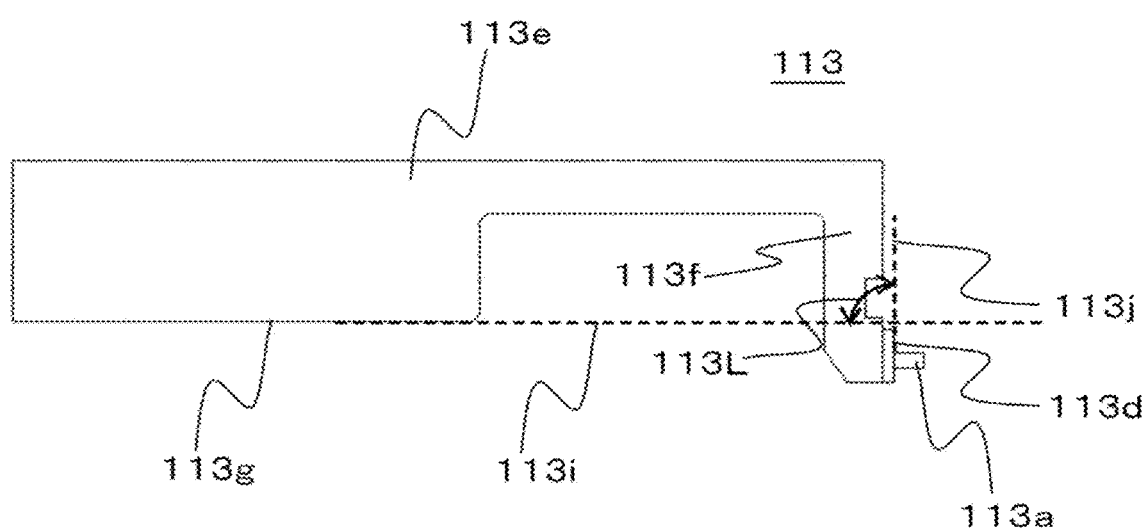
FIG. 12 is a side view of the image sensor mounting bracket according to Embodiment 2.
Figure 13:
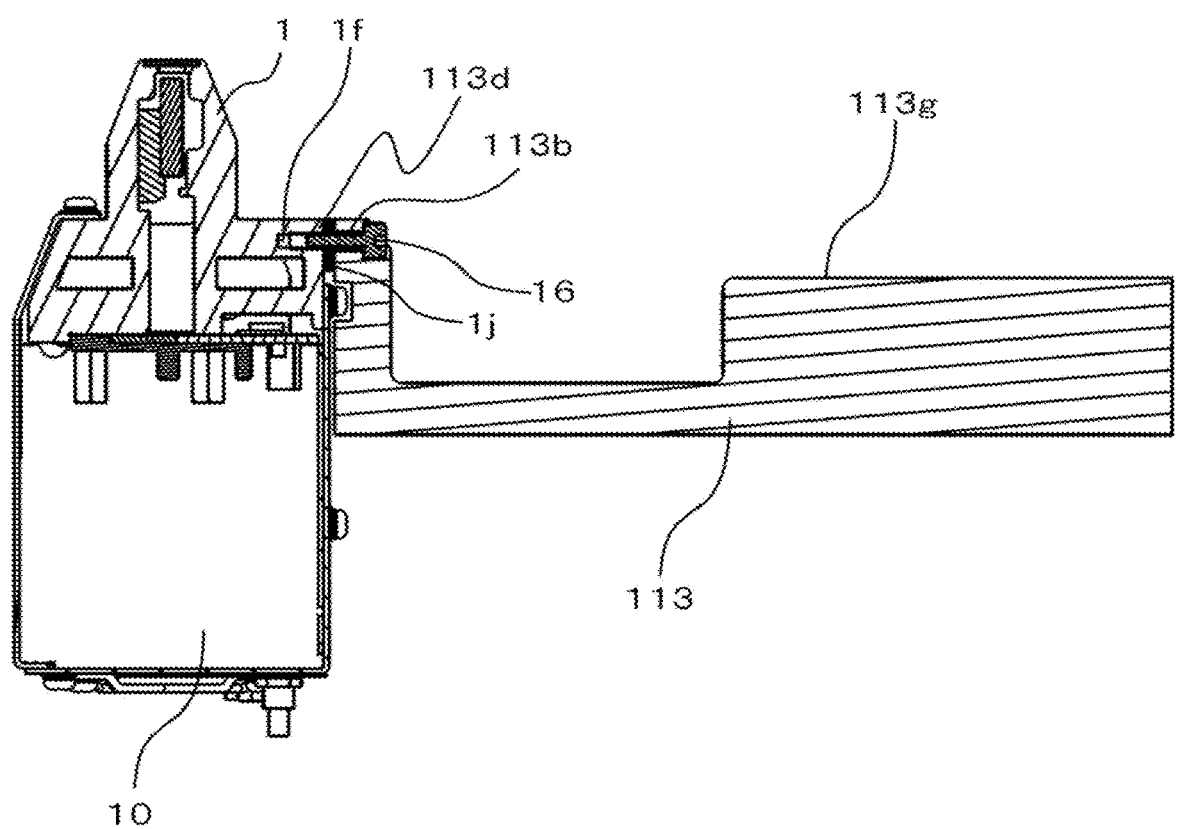
FIG. 13 is a cross-sectional view taken along a plane C-C' in FIG. 9.

FIG. 9 is a perspective view of a mounting bracket according to Embodiment 2 that is attached to the image sensor. FIG. 10 is a perspective view of the image sensor mounting bracket according to Embodiment 2. FIGS. 11 and 12 are side views of the image sensor mounting bracket according to Embodiment 2. FIG. 13 is a cross-sectional view of the image sensor 10 and the mounting bracket 113 according to Embodiment 2 of the present disclosure, which is taken along a plane C-C' in FIG. 9. In FIGS. 9 to 12, components that are the same as or equivalent to the components illustrated in FIGS. 1 to 8 are assigned the same reference sign, and the description thereof is omitted. Except that the mounting bracket 113 has a recess 113h in an attachment target object fastening surface 113g, elements of the mounting bracket 113 having reference numerals 113a to 113L, have the same operational effects as the elements of the mounting bracket 13 having the reference numerals 13a to 13L. Also, in FIG. 12, an extension line 113j (also referred to as a virtual surface of an image sensor fastening surface 113d or as a first virtual surface) of the image sensor fastening surface 113d intersects, at an intersection angle 113L of 90 degrees (right angle), an extension line 113i (also referred to as a virtual surface of an attachment target object fastening surface 113g or as a second virtual surface) of the attachment target object fastening surface 113g.

The mounting bracket 113 according to Embodiment 2 has a structure in which the attachment target object fastening portion 13e and the image sensor-side fastening portion 13f are formed integrally with each other in the mounting bracket 13 according to Embodiment 1 that is illustrated in FIG. 6, and the mounting bracket 113 has the same operation effects as the mounting bracket 13.

Embodiment 3

Figure 14:
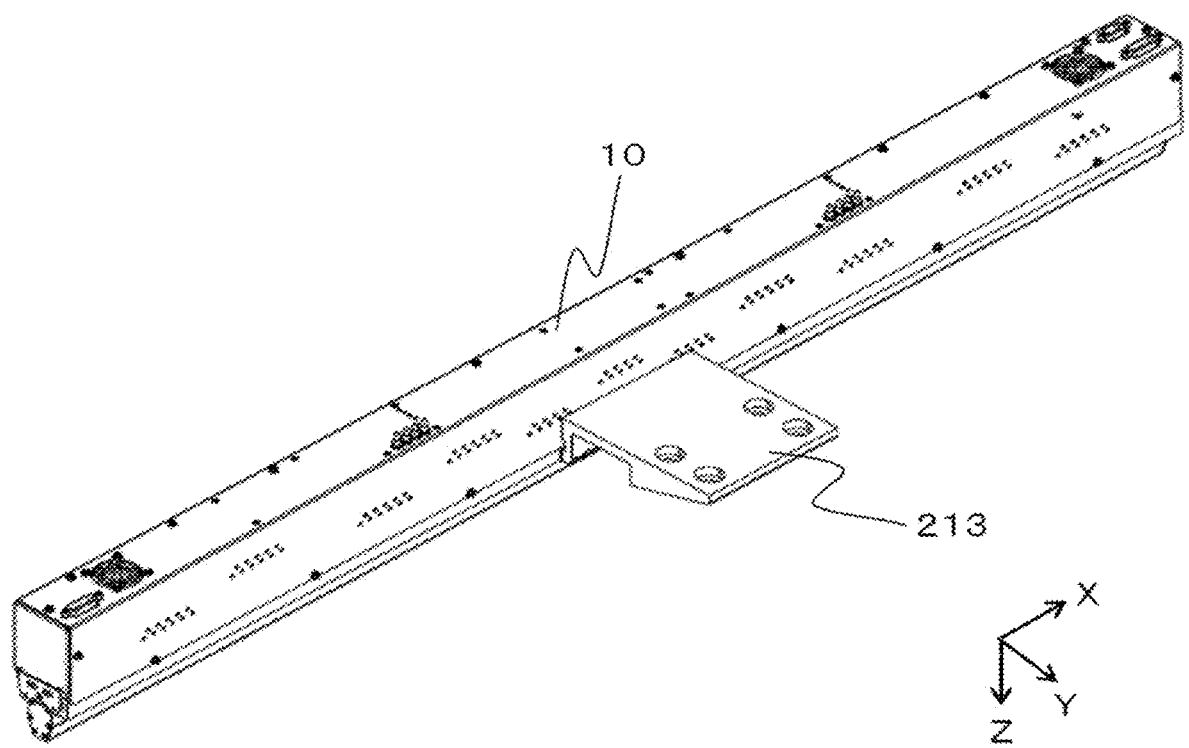
FIG. 14 is a perspective view of a mounting bracket according to Embodiment 3 that is attached to the image sensor.
Figure 15:
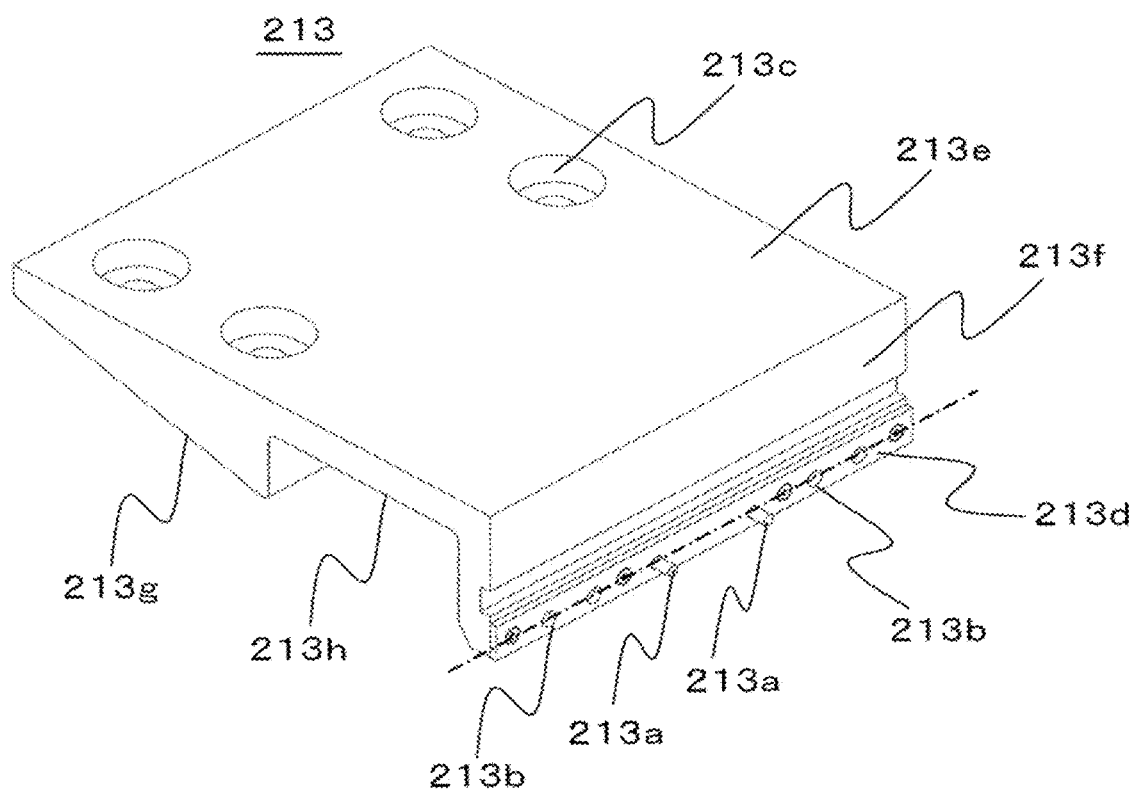
FIG. 15 is a perspective view of the image sensor mounting bracket according to Embodiment.
Figure 16:
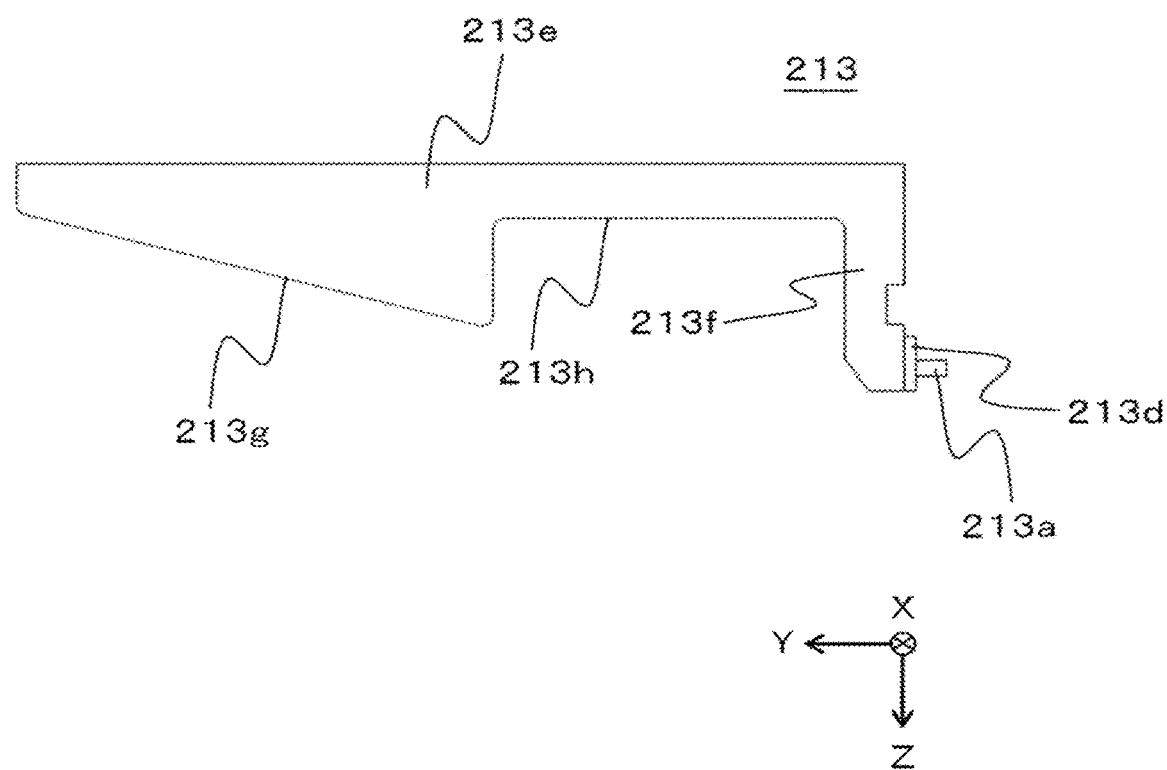
FIG. 16 is a side view of the image sensor mounting bracket according to Embodiment 3.
Figure 17:
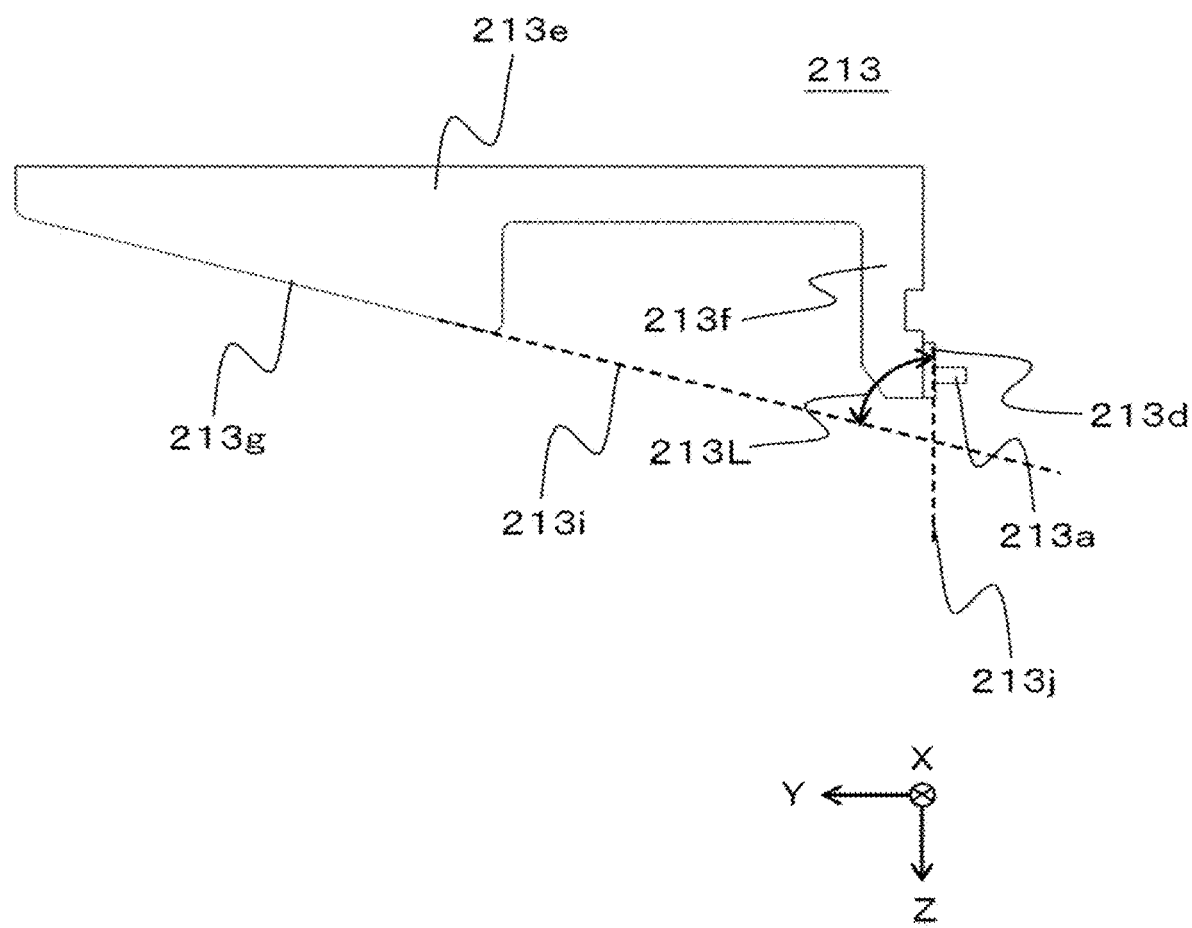
FIG. 17 is a side view of the image sensor mounting bracket according to Embodiment 3.

FIG. 14 is a perspective view of a mounting bracket according to Embodiment 3 that is attached to the image sensor. FIG. 15 is a perspective view of the image sensor mounting bracket according to Embodiment 3. FIGS. 16 and 17 are side views of the image sensor mounting bracket according to Embodiment 3.

FIGS. 15 to 17 illustrate a mounting bracket 213 according to Embodiment 3 in which the image sensor 10 is fixed obliquely by forming an attachment target object fastening surface 213g that is a sloped surface to be attached to the attachment target object. In FIGS. 14 to 17, components that are the same as or equivalent to the components illustrated in FIGS. 1 to 13 are assigned the same reference sign, and the description thereof is omitted. Elements of the mounting bracket 213 having the reference numerals 213a to 213L have the same operation effect as the elements of the mounting bracket 113 having reference numerals 113a to 113L. Also, in FIG. 17, an extension line 213j (also referred to as a virtual surface of an image sensor fastening surface 213d or as a first virtual surface) of the image sensor fastening surface 213d intersects an extension line 213i (also referred to as a virtual surface of an attachment target object fastening surface 213g or as a second virtual surface) of the attachment target object fastening surface 213g at an intersection angle 213L that is an acute angle of less than 90 degrees on a side on which both surfaces face each other.

Figure 18:
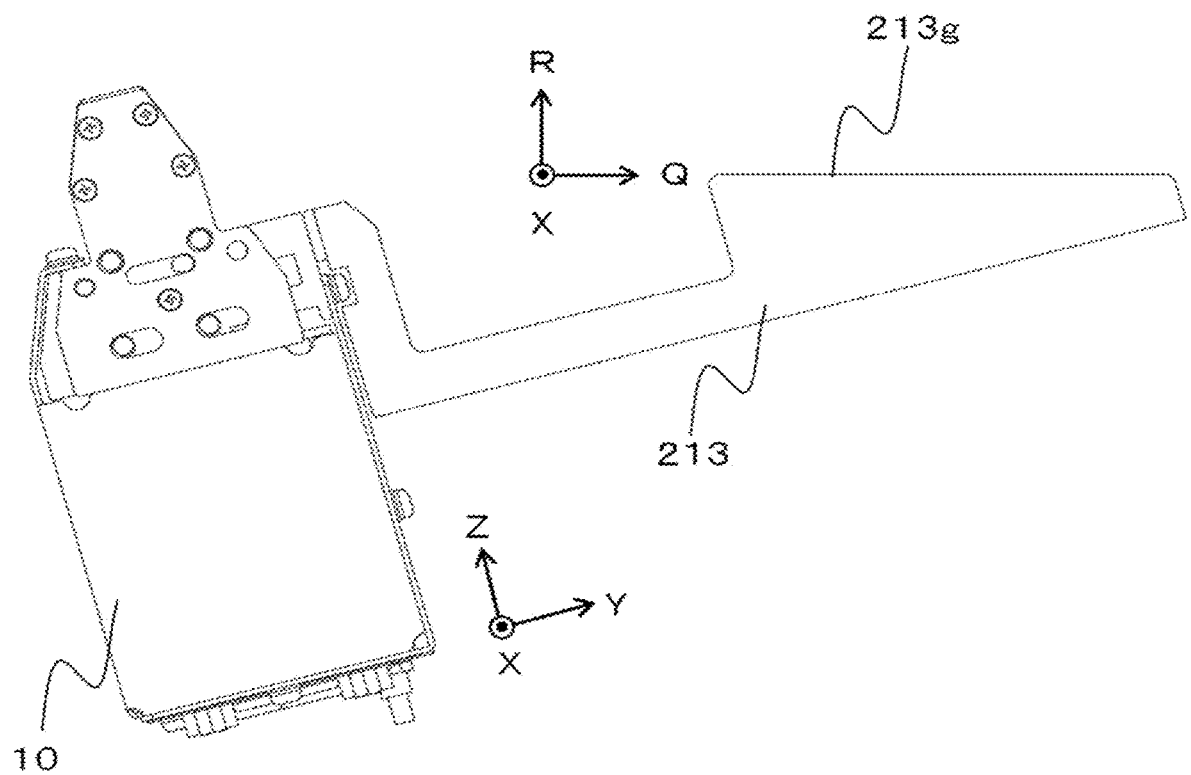
FIG. 18 is a side view of an image sensor mounting bracket according to Embodiment 3 of the present disclosure.

As illustrated in FIG. 18, the objective of Embodiment 3 is to provide a long and tiltable image sensor. Therefore, the attachment target object fastening surface 213g of the mounting bracket 213 is formed into a slope shape, thereby enabling the image sensor to be fixed obliquely. In FIG. 18, an R axis, a Q axis, and an X axis are respectively the reading distance direction, the sub-scanning direction, and the main scanning direction when the image sensor is fixed obliquely.

Although the mounting bracket 213 illustrated in FIGS. 15 to 17 is a modified example of the mounting bracket 113, the attachment target object fastening surface 13g of the mounting bracket 13 illustrated in FIG. 6 may be formed as a slope.

REFERENCE SIGNS LIST

1 Frame
1a Flat surface (lateral surface)
1b Flat surface (lateral surface)
1c Round hole
1d Elongated hole
1e Threaded hole
1f Threaded hole
1g Slope
1i Lens fixing plate abutment surface
1j Flat surface portion
1k Elongated hole
1m Focus adjustment slot
2 Transparent body
3 Cover
3a Slope
4 Sealing plate
5 Base plate supporting plate
6 Lens fixing plate
7 Imaging optical system
8 Base plate
9 Base plate
10 Image sensor
11 Sensor IC
12 Cover
13, 113, 213 Mounting bracket
13a, 113a, 213a Pilot pin (positioning pin)
13b, 113b, 213b Screw through hole (image sensor fastening through hole)
13c, 113c, 213c Elongated hole (through hole)
13d, 113d, 213d Image sensor fastening surface (first fastening surface)
13e, 113e, 213e Attachment target object fastening portion (second fastening portion)
13f, 113f, 213f Image sensor-side fastening portion (first fastening portion)
13g, 113g, 213g Attachment target object fastening surface (second fastening surface)
113h, 213h Recess
13s Screw
13L, 113L, 213L Intersection angle
14 Screw
15 Screw
16 Screw
x Main scanning direction
y Sub-scanning direction
z Reading distance direction
RL1 Reference line (second reference line)
RL2 Reference line (first reference line)

The invention claimed is:

1. An image sensor mounting bracket for mounting an image sensor to an attachment target object, the image sensor mounting bracket comprising:
a first fastening element to be fastened to a lateral surface of the image sensor, the lateral surface extending in a main scanning direction; and
a second fastening element to be fastened to the attachment target object, the second fastening element intersecting with the first fastening element, and extending in a sub scanning direction,
wherein
the first fastening element includes a first fastening surface that abuts the image sensor and has (i) a plurality of positioning pins to determine a position of mounting of the image sensor mounting bracket to the image sensor, the positioning pins being arranged in the main scanning direction on a straight line parallel to the main scanning direction, and (ii) a plurality of image sensor fastening through holes penetrating to a fastening member of the image sensor that fastens the image sensor mounting bracket,
the image sensor fastening through holes extend perpendicularly to the first fastening surface and are arranged in the main scanning direction on the straight line parallel to the main scanning direction in which the plurality of positioning pins are disposed,
the image sensor fastening through holes are arranged outside a portion of the first fastening surface between two positioning pins among the plurality of positioning pins in the main scanning direction, and
the second fastening element includes a second fastening surface that abuts the attachment target object and has a plurality of elongated through holes that are arranged in the main scanning direction and in the sub-scanning direction and each elongate in the sub-scanning direction.

2. The image sensor mounting bracket according to claim 1, wherein
an intersection angle between a first virtual plane including the first fastening surface of the first fastening element and a second virtual plane including the second fastening surface of the second fastening element is 90 degrees, and
the second fastening element includes a recess located between (i) the second fastening surface having the elongated through holes and (ii) the first fastening element, the recess having a depth direction perpendicular to the main scanning direction and the sub-scanning direction.

3. An image sensor device comprising:
the image sensor mounting bracket according to claim 2; and
an image sensor having a lateral surface that extends in the main scanning direction and has a plurality of positioning holes formed on a first reference line parallel to the main scanning direction,
wherein
at least one of the positioning holes is formed as an elongated hole, and
one of the positioning pins of the first fastening element of the image sensor mounting bracket is inserted into the at least one elongated hole with a clearance fit.

4. The image sensor device according to claim 3, wherein
the image sensor includes a screw or a screw hole to mount the image sensor on the attachment target object, the screw or the screw hole being arranged on a second reference line located on an end surface of the image sensor in the main scanning direction, and
the second reference line is a straight line parallel to the sub-scanning direction and intersects the first reference line.

5. The image sensor mounting bracket according to claim 1, wherein
an intersection angle between a first virtual plane including the first fastening surface of the first fastening element and a second virtual plane including the second fastening surface of the second fastening element is an acute angle, and
the second fastening element includes a recess located between (i) the second fastening surface having the elongated through holes and (ii) the first fastening element, the recess having a depth direction perpendicular to the main scanning direction and the sub-scanning direction.

6. An image sensor device comprising:
the image sensor mounting bracket according to claim 5; and
an image sensor having a lateral surface that extends in the main scanning direction and has a plurality of positioning holes formed on a first reference line parallel to the main scanning direction,
wherein
at least one of the positioning holes is formed as an elongated hole, and
one of the positioning pins of the first fastening element of the image sensor mounting bracket is inserted into the at least one elongated hole with a clearance fit.

7. The image sensor device according to claim 6, wherein
the image sensor includes a screw or a screw hole to mount the image sensor on the attachment target object, the screw or the screw hole being arranged on a second reference line located on an end surface of the image sensor in the main scanning direction, and
the second reference line is a straight line parallel to the sub-scanning direction and intersects the first reference line.

8. An image sensor device comprising:
the image sensor mounting bracket according to claim 1; and
an image sensor having a lateral surface that extends in the main scanning direction and has a plurality of positioning holes formed on a first reference line parallel to the main scanning direction,
wherein
at least one of the positioning holes is formed as an elongated hole, and
one of the positioning pins of the first fastening element of the image sensor mounting bracket is inserted into the at least one elongated hole with a clearance fit.

9. The image sensor device according to claim 8, wherein
the image sensor includes a screw or a screw hole to mount the image sensor on the attachment target object, the screw or the screw hole being arranged on a second reference line located on an end surface of the image sensor in the main scanning direction, and
the second reference line is a straight line parallel to the sub-scanning direction and intersects the first reference line.

10. The image sensor mounting bracket according to claim 1, wherein the plurality of positioning pins and the plurality of image sensor fastening through holes are arranged on a same straight line.

11. The image sensor mounting bracket according to claim 10, wherein an intersection angle between a first virtual plane including the first fastening surface of the first fastening element and a second virtual plane including the second fastening surface of the second fastening element is 90 degrees, and
the second fastening element includes a recess located between (i) the second fastening surface having the elongated through holes and (ii) the first fastening element, the recess having a depth direction perpendicular to the main scanning direction and the sub-scanning direction.

12. An image sensor device comprising:
the image sensor mounting bracket according to claim 11; and
an image sensor having a lateral surface that extends in the main scanning direction and has a plurality of positioning holes formed on a first reference line parallel to the main scanning direction,
wherein
at least one of the positioning holes is formed as an elongated hole, and
one of the positioning pins of the first fastening element of the image sensor mounting bracket is inserted into the at least one elongated hole with a clearance fit.

13. The image sensor device according to claim 12, wherein
the image sensor includes a screw or a screw hole to mount the image sensor on the attachment target object, the screw or the screw hole being arranged on a second reference line located on an end surface of the image sensor in the main scanning direction, and
the second reference line is a straight line parallel to the sub-scanning direction and intersects the first reference line.

14. The image sensor mounting bracket according to claim 10, wherein an intersection angle between a first virtual plane including the first fastening surface of the first fastening element and a second virtual plane including the second fastening surface of the second fastening element is an acute angle, and the second fastening element includes a recess located between (i) the second fastening surface having the elongated through holes and (ii) the first fastening element, the recess having a depth direction perpendicular to the main scanning direction and the sub-scanning direction.

15. An image sensor device comprising:

the image sensor mounting bracket according to claim 14; and an image sensor having a lateral surface that extends in the main scanning direction and has a plurality of positioning holes formed on a first reference line parallel to the main scanning direction, wherein at least one of the positioning holes is formed as an elongated hole, and one of the positioning pins of the first fastening element of the image sensor mounting bracket is inserted into the at least one elongated hole with a clearance fit.

16. The image sensor device according to claim 15, wherein the image sensor includes a screw or a screw hole to mount the image sensor on the attachment target object, the screw or the screw hole being arranged on a second reference line located on an end surface of the image sensor in the main scanning direction, and the second reference line is a straight line parallel to the sub-scanning direction and intersects the first reference line.

17. An image sensor device comprising:

the image sensor mounting bracket according to claim 10; and an image sensor having a lateral surface that extends in the main scanning direction and has a plurality of positioning holes formed on a first reference line parallel to the main scanning direction, wherein at least one of the positioning holes is formed as an elongated hole, and one of the positioning pins of the first fastening element of the image sensor mounting bracket is inserted into the at least one elongated hole with a clearance fit.

18. The image sensor device according to claim 17, wherein the image sensor includes a screw or a screw hole to mount the image sensor on the attachment target object, the screw or the screw hole being arranged on a second reference line located on an end surface of the image sensor in the main scanning direction, and the second reference line is a straight line parallel to the sub-scanning direction and intersects the first reference line.

\* \* \* \* \*